United States Patent [19]

Selfors

[11] Patent Number: 4,592,113
[45] Date of Patent: Jun. 3, 1986

[54] FISH FILETING KNIFE

[75] Inventor: Donald L. Selfors, Minneapolis, Minn.

[73] Assignee: G & D Investments, Ltd., Minneapolis, Minn.

[21] Appl. No.: 636,159

[22] Filed: Jul. 31, 1984

[51] Int. Cl.⁴ .............................................. A22C 25/16
[52] U.S. Cl. ............................................ 17/66; 30/353
[58] Field of Search ................ 17/66, 56, 46; 30/343, 30/344, 346, 353

[56] References Cited

U.S. PATENT DOCUMENTS

| D. 23,659 | 9/1984 | Koenig . | |
|---|---|---|---|
| 127,187 | 5/1872 | Peabody . | |
| 215,616 | 5/1879 | Hetherington et al. | 30/353 X |
| 260,310 | 6/1882 | Moroney | 30/353 X |
| 445,196 | 1/1891 | Peray | 30/353 X |
| 834,888 | 11/1906 | Calvert | 30/353 X |
| 1,130,281 | 3/1915 | Hay . | |
| 1,488,326 | 3/1924 | Dubee | 30/353 X |
| 1,527,561 | 2/1925 | Klum | 30/353 X |
| 1,638,807 | 8/1927 | Hopwood | 30/353 X |
| 2,573,601 | 10/1951 | Rathmell | 30/353 X |
| 2,718,700 | 9/1955 | Stecher | 30/344 X |

*Primary Examiner*—Willie G. Abercrombie
*Attorney, Agent, or Firm*—Merchant, Gould, Smith, Edell, Welter & Schmidt

[57] ABSTRACT

A fish fileting apparatus is disclosed. The fish fileting apparatus (10) has an elongated flat metal blade (12) having a pair of cutting edges (18) along each side of the blade, a handle (22) which is offset from the blade (12), and a connecting portion (20) which interconnects the blade (12) and the handle (22). The connecting portion (20) is inclined with respect to the blade (12) and the handle (22) such that the blade (12) may rest uniformly on a surface while a users hand is gripped around the handle (22).

9 Claims, 6 Drawing Figures

U.S. Patent    Jun. 3, 1986    4,592,113
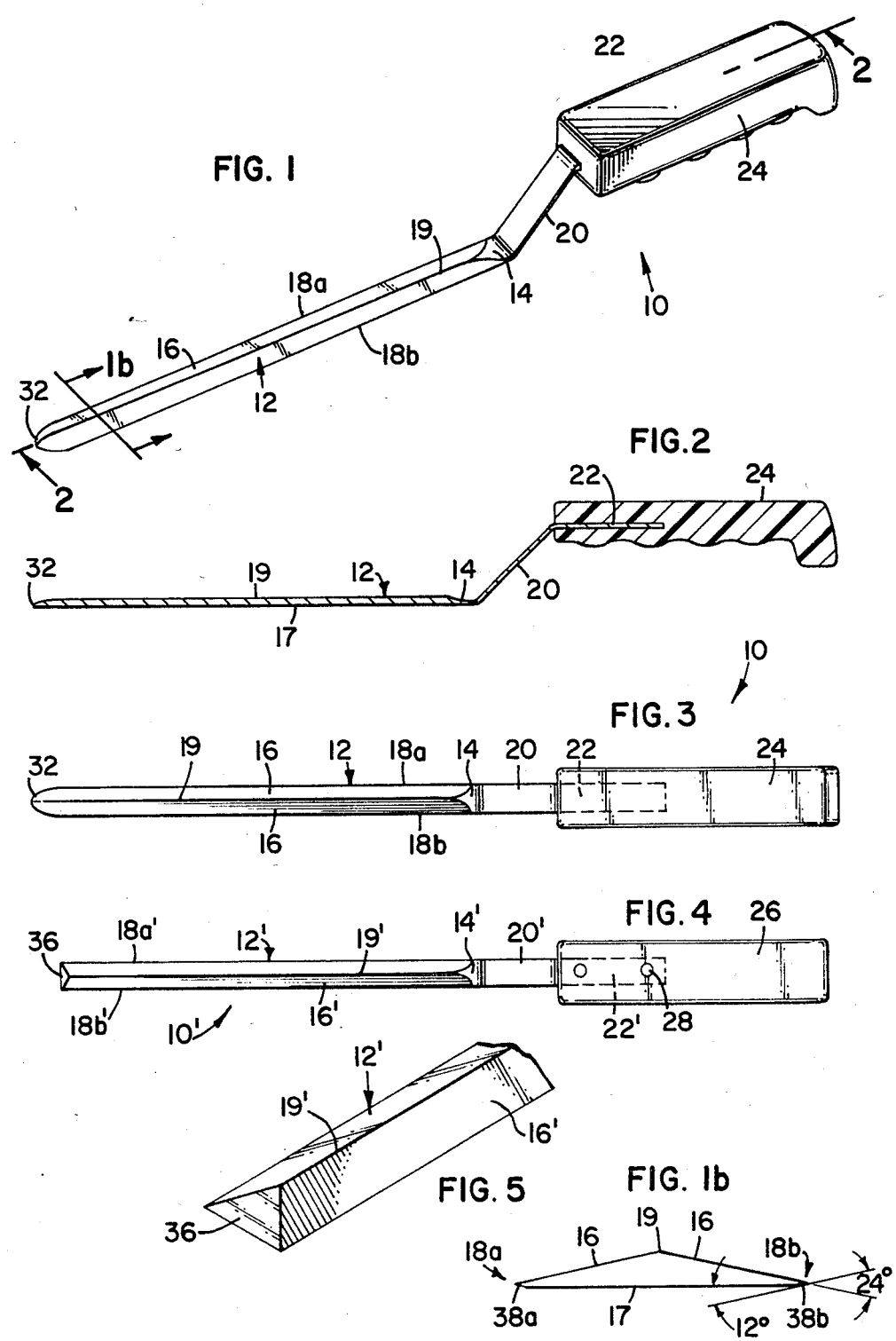

FISH FILETING KNIFE

TECHNICAL FIELD

The present invention relates to a fish fileting knife. More particularly, the present invention relates to a fish fileting knife having an elongated flat metal blade and a handle which is offset above the blade. The configuration of the knife enables an individual to filet fish in a safer and more efficient manner.

BACKGROUND OF THE INVENTION

Currently, there are a number of fish fileting knives on the market. In some cases, fish fileting is performed with ordinary household knives. Butcher knives and steak knives are commonly used to filet fish.

Fileting fish with existing knives can be difficult. Existing fileting knives require that a hand be placed in close proximity to the knife blade during the Fileting process. This increases the possibility of hand injuries such as cuts. The fileting process may result in a portion of meat remaining attached to the outer skin of the fish or cutting through the skin at an improper location. This occurs because the blade of the fileting knife is not rested uniformly on the portion of the fish being fileted. Holding the fileting knife uniformly on the surface of the filet during the entire fileting process is difficult due to the straight alignment of the blade and handle on existing fileting knives. Finally, most existing knives have a blade portion with one cutting edge. Frequent use may require that the knife be sharpened on a regular basis.

It is the purpose of the present invention to provide a fish fileting knife which is designed to make fish cleaning safe, easier and more efficient.

SUMMARY OF THE INVENTION

The present invention relates to a fish fileting knife including an elongated flat metal blade having a pair of cutting edges along each side of the blade, a handle which is offset above the blade, and a connecting portion which interconnects the blade and the handle.

The present invention is particularly advantageous in that the offset handle enables fish fileting to be accomplished without placing a hand in the immediate proximity of the knife blade during the fileting process. The offset handle also allows the knife blade to rest uniformly on the surface of the filet, thereby, facilitating more efficient fish fileting.

The present invention has a pair of cutting edges along each side of the blade. This makes the present invention more versatile then many of the existing fileting knives on the market which have only one cutting edge. Additionally, the extra cutting edge of the present invention should reduce the frequency of blade sharpening.

An advantage of the present invention is the variety of embodiments which are available to meet individual fish fileting needs and preferences. In one embodiment of the invention the handle is formed of plastic. A plastic handle has several advantages. First, a plastic handle is impervious to water. Second, a plastic handle can be easily cleaned. Finally, a plastic handle can be readily molded into a variety of desired shapes and sizes.

In another embodiment of the invention the handle is wooden and is fastened to the knife by rivets. An advantage of a wooden handle is that it provides good gripping surface that is not slippery when wet. A wooden handle thus can be easily grasped. Additionally, the material for such a handle is readily available and is inexpensive.

A number of different blade configurations for the present invention are also possible. In one embodiment of the present invention the blade is rounded at the outer end to allow a swooping cut into the filet without tearing the fish skin. In another embodiment the blade has a squared end which makes it easier to penetrate the body of the fish and open up an area for fileting.

These and other advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, like reference numerals indicate corresponding parts throughout the several views.

FIG. 1 is a perspective view of a preferred embodiment of the present invention;

FIG. 1b is a cross sectional view along the line 1b—1b in FIG. 1;

FIG. 2 is a cross sectional view along the line 2—2 in FIG. 1;

FIG. 3 is a top plan view of the embodiment shown in FIG. 1;

FIG. 4 is a top plan view of an alternate embodiment; and

FIG. 5 is an enlarged fragmental view of the outer blade end of the alternate embodiment shown in FIG. 4.

DETAILED DESCRIPTION OF A PREFERRED EMBODIMENT

Referring now to the drawings, there is shown in FIGS. 1 through 3 a preferred embodiment of the present invention generally referred to by the reference number 10. As is illustrated, in the preferred embodiment of the present invention, the fileting knife 10 includes an elongated flat metal blade 12 having a pair of cutting edges 18a and 18b along respective sides of the blade 12, a handle 22 offset from the blade 12, and a connecting portion 20 which interconnects the blade 12 and the handle 22.

In the preferred embodiment the elongated flat metal blade 12 has a planar lower surface 17 and a beveled upper surface 16 which is directed downwardly along each side of the blade to provide the cutting edges 18a, 18b. More specifically, the beveled upper surface 16 of the blade 12 slopes downwardly away from the apex 19 of the upper surface 16 forming a downwardly diverging "V" shape. The lower surface 17 is ground to provide a bevel 38a and 38b to provide an edge for cutting to pull the flesh upwardly and the skin downwardly. The bevel 38b for example may be at an angle of about 12 degrees with respect to the surface 17 and an angle of about 24 degrees with respect to surface 16. The blade 12 may be constructed of any suitable material such as spring chrome steel.

The handle 22 is offset from the blade 12 and is interconnected to the inner end 14 of the blade 12 by a connecting portion 20. In the preferred embodiment the connecting portion 20 projects upwardly and outwardly at a 55 degree angle from the plane of the blade 12. The 55 degree angle raises and offsets the handle 22 so that fish fileting can be accomplished without placing a hand in the proximity of the knife blade 12 during the fish fileting process.

It will be appreciated that by offsetting the handle 22 from the blade 12 the lower surface 17 of the blade 12 may rest uniformly on a surface while the users hand is gripped around the handle 22. Leverage and blade stability, both of which are important in fish fileting, appear to be maximized when the connecting portion 20 projects outwardly and upwardly from the blade 12 at a 45 degree angle.

In the preferred embodiment illustrated in FIG. 1, the blade 12 has a rounded outer end 32. The rounded end 32 facilitates the making of swooping type cuts which do not tear the skin of the fish being fileted. The handle 22 of the preferred embodiment shown in FIGS. 1 through 3 has a molded plastic body 24. The plastic handle body 24 is readily molded into a desired shape, is impervious to water and can be easily cleaned.

Illustrated in FIG. 4 is an alternate embodiment of the fileting knife 10'. The blade 12' in the alternate embodiment has a squared and sharpened outer end 36. The squared and sharpened end is shown in more detail in FIG. 5. The configuration of the squared and sharpened outer end 36 of the blade 12' facilitates the piercing and reaching into the body of the fish to open up an area for fileting. The handle 22' of the alternate embodiment of the present invention shown in FIG. 4 has a wooden body 26 which is attached to the handle 22' of the knife 10' by fastening rivets 28. The wooden handle 26 has the advantages of being easily gripped and relatively inexpensive.

As previously indicated, the structural configuration of the present invention provides a safer, easier and more efficient method for fileting fish. Using the present invention, the flesh of a fish can be removed from the backbone so as to produce two filets. The flesh is separated on each of the filets by slicing downwardly through the filet with the present invention 10 until contact is made with the skin. The fileting knife 10 is then run horizontally along the skin for the entire length of the filet. It will be appreciated that the structural configuration of the present invention 10 allows the lower surface 17 of the blade 12 to rest uniformly on the surface during separation of the flesh from the filet and does not require that a hand be placed in close proximity to the knife blade.

It is to be understood, however that even though numerous advantages and characteristics of the invention have been set forth in the foregoing description, together with details of the structure and function of the invention, the disclosure is illustrative only, and changes may be made in detail, especially in matters of shape and size of the parts within the principal of the invention, to the full extent indicated by the broad general meaning of the terms of which the appended claims are expressed.

What is claimed is:

1. A fish fileting knife comprising:
    (a) an elongated flat metal blade having a pair of cutting edges along each side of said blade, said flat metal blade having a substantially planar lower surface and an upper surface which is beveled downwardly along each side of said blade, said lower surface beveled upwardly at about a 12 degree angle along each side of said blade to meet said downward bevel on said upper surface to provide said cutting edges so that each of said cutting edges is elevated from said planar lower surface and so that said lower surface provides a skin anchoring surface proximate the cutting edge to facilitate the clean separation of flesh and skin;
    (b) a handle which is offset from said blade; and
    (c) a connecting portion which interconnects said blade and said handle, said connecting portion being inclined with respect to said blade and said handle such that said blade may rest uniformly on a surface while a users hand is gripped around said handle.

2. A fileting knife in accordance with claim 1 wherein said connecting portion projects upwardly at a 55 degree angle from the plane of the blade.

3. A fileting knife in accordance with claim 1 wherein said blade has a rounded outer end.

4. A fileting knife in accordance with claim 1 wherein said blade has a squared and sharpened outer end.

5. A fileting knife in accordance with claim 1 wherein the handle includes a molded plastic body.

6. A fileting knife in accordance with claim 1 wherein the handle includes a wooden body and means for fastening the wooden body to said knife.

7. A fileting knife comprising:
    (a) a straight planar metal blade portion having an inner end and a squared and sharpened outer end, the upper surface of the blade having a downwardly diverging "V" shape which terminates at two sharpened edges;
    (b) a handle portion parallel to and offset above the blade;
    (c) a connecting portion interconnecting said blade portion to said handle portion, said connecting portion projecting upwardly at about a 55 degree angle from the plane of the blade and interconnecting the inner end of the blade portion to the handle portion.

8. A fileting knife in accordance with claim 7 wherein the handle portion includes a molded plastic body.

9. A fileting knife of claim 7 wherein the handle portion includes a wooden body and means for fastening the wooden body to said knife.

* * * * *